(12) United States Patent
Adler et al.

(10) Patent No.: US 10,271,209 B2
(45) Date of Patent: Apr. 23, 2019

(54) SESSION PROTOCOL FOR BACKWARD SECURITY BETWEEN PAIRED DEVICES

(71) Applicant: Apple Inc., Cupertino, CA (US)

(72) Inventors: Mitchell D. Adler, Los Gatos, CA (US); Yannick L. Sierra, San Francisco, CA (US); Ganesha A. G. Batta, Cupertino, CA (US); Michael Giles, San Jose, CA (US); Akshay M. Srivatsa, Santa Clara, CA (US); Craig P. Dooley, Los Gatos, CA (US); Sriram Hariharan, San Jose, CA (US); Robert D. Watson, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 153 days.

(21) Appl. No.: 15/275,231

(22) Filed: Sep. 23, 2016

(65) Prior Publication Data
US 2017/0359717 A1 Dec. 14, 2017

Related U.S. Application Data

(60) Provisional application No. 62/349,030, filed on Jun. 12, 2016.

(51) Int. Cl.
| | |
|---|---|
| *H04L 29/06* | (2006.01) |
| *H04W 12/04* | (2009.01) |
| *H04L 9/08* | (2006.01) |
| *H04L 9/14* | (2006.01) |
| *H04W 12/02* | (2009.01) |

(52) U.S. Cl.
CPC .......... *H04W 12/04* (2013.01); *H04L 9/0891* (2013.01); *H04L 9/0894* (2013.01); *H04L 9/14* (2013.01); *H04L 63/061* (2013.01); *H04L 63/0435* (2013.01); *H04L 2209/80* (2013.01); *H04L 2463/061* (2013.01); *H04W 12/02* (2013.01)

(58) Field of Classification Search
None
See application file for complete search history.

(56) References Cited

U.S. PATENT DOCUMENTS

| | | | |
|---|---|---|---|
| 6,539,092 B1* | 3/2003 | Kocher | G06Q 20/341 380/252 |
| 6,965,992 B1* | 11/2005 | Joseph | H04L 63/0428 380/281 |

(Continued)

*Primary Examiner* — Malcolm Cribbs
(74) *Attorney, Agent, or Firm* — Morgan, Lewis and Bockius LLP

(57) ABSTRACT

Some embodiments provide a method for establishing a secured session with backward security between a first device and a second device. In some embodiments, the method establishes a communication session between the first and second devices using shared keys stored at the first and second devices. The method exchanges encrypted data between the first and second devices as a part of the communication session. The method, upon completion of the communication session, modifies the shared key at the first device in a predictable way. The shared key is modified at the second device in the same predictable way. The method then stores the modified shared key at the first device. The modified shared key cannot be used to decrypt any portion of the encrypted data of the current and previous communication sessions.

33 Claims, 13 Drawing Sheets

(56) References Cited

U.S. PATENT DOCUMENTS

| | | | |
|---|---|---|---|
| 7,434,046 B1* | 10/2008 | Srivastava | H04L 9/0825 |
| | | | 380/264 |
| 9,635,011 B1* | 4/2017 | Wu | H04L 63/0807 |
| 2004/0143710 A1* | 7/2004 | Walmsley | B41J 2/04505 |
| | | | 711/144 |
| 2005/0235152 A1* | 10/2005 | Ozaki | H04L 9/0841 |
| | | | 713/170 |
| 2010/0169563 A1* | 7/2010 | Horner | G11C 15/00 |
| | | | 711/108 |
| 2014/0208112 A1 | 7/2014 | McDonald et al. | |
| 2014/0310515 A1 | 10/2014 | Kim et al. | |
| 2014/0351587 A1* | 11/2014 | Dash | G06F 21/44 |
| | | | 713/165 |
| 2017/0063544 A1* | 3/2017 | Oxford | H04L 9/0861 |
| 2017/0063853 A1* | 3/2017 | Lim | H04L 9/0861 |
| 2017/0149562 A1* | 5/2017 | Takada | H04L 9/08 |
| 2017/0346851 A1* | 11/2017 | Drake | H04L 63/1466 |

* cited by examiner

SESSION PROTOCOL FOR BACKWARD SECURITY BETWEEN PAIRED DEVICES

BACKGROUND

Many devices communicate with other devices through various wireless protocols (e.g., using a Bluetooth protocol). While wireless protocols offer convenience, data that is communicated through such wireless protocols are particularly susceptible to capture of the transmitted data. The transmitted data is often encrypted, but the encryption becomes vulnerable if one of the keys used to encrypt/decrypt the data is compromised. For example, a key can be compromised after a physical attack that retrieves the key directly from the flash memory of one of the devices. If an attacker can retrieve the key, any previously recorded communications can be decrypted.

In order to provide security for the previously recorded communications (i.e., backward security) even when a key is compromised, some methods use various operations (e.g., Diffie-Hellman, etc.) to generate unique ephemeral session keys for each communication session between a pair of devices. Ephemeral keys are removed after each session so even if an attacker gets access to a particular key, encrypted data from previous sessions is still secured, providing backward security. However, generating such unique ephemeral keys for each session requires significant power and hardware, and building devices with such capabilities increases costs and affects the battery life of the devices. It is desirable to provide backward security for low-power or low-capability devices.

BRIEF SUMMARY

Some embodiments of the invention provide a method for establishing a secured session with backward security between a first device and a second device. In some embodiments, the method operates to modify and synchronize link keys between two paired devices (e.g., through the Bluetooth protocol) to generate new keys for each communication session between the devices. In some embodiments, prior to establishing the communication session, the method pairs the first device and the second device to generate the initial link keys at the first and second devices and to store the generated link keys as shared link keys.

In some embodiments, at least one of the devices is a connected device that is associated with several other connected devices. The connected devices of some embodiments are associated with a particular user account. The user account of some embodiments is associated with a cloud service that syncs data between the connected devices and provides storage for the synced data. In some embodiments, the cloud service also syncs link keys that are used to establish secure communication sessions with accessory devices.

In some embodiments, an accessory device (e.g., headset, speaker, etc.) can establish communication sessions with the connected devices associated with the particular user account, as well as with other devices that are not associated with the particular user account. In some embodiments, the connected device is a master or source device and the accessory device is a slave or receiving device. The accessory device of some embodiments is a low-power, low-capability (e.g., no input/output, display area, etc.) device.

The method of some embodiments establishes a communication session between the first and second devices using link keys that are stored at each of the devices. The link keys are used by both devices to encrypt and decrypt data that is transmitted between the devices for a specific communication session. In some embodiments, the link keys are initially generated using a secure pairing operation (e.g., Bluetooth Secure Simple Pairing (BT SSP)) between the two devices.

In some embodiments, the link key for a device and a particular accessory is shared between all of the connected devices associated with a user account. In some such embodiments, the link key for the particular accessory is retrieved from a cloud service (e.g., iCloud). When a connected device does not have access to the cloud service, but has made a previous connection with the particular accessory, the device of some embodiments uses a link key that is stored in a local key storage of the device.

In order to establish the secure communication session, some embodiments establish an unencrypted fixed channel between paired devices (a source device and a particular accessory device) by sending an initialization message that includes a key identifier (or hint). In some embodiments, a key identifier is specific to a particular source device and the particular accessory device. Alternatively, or conjunctively, the key identifier of some embodiments identifies a shared link key that is to be used for communication sessions between any of the devices associated with a user account and a particular accessory device. The connected device retrieves or syncs the shared link key from the cloud service, while the accessory device uses the key identifier to retrieve a corresponding link key from a key storage of the second device.

The method of some embodiments uses the shared link key at the connected device and the corresponding link key of the second device to generate a derived key, which is used to exchange one-time setup messages (e.g., to exchange entropy) between the devices to generate secure session keys to be used for the secure communication session. The derived key of some embodiments stretches a 128-bit link key to 256-bits.

In some cases, the shared link key of the connected device and the corresponding link key need to be synchronized before generating the derived key (i.e., when the shared link key and the corresponding link key do not match). In some embodiments, the shared link key and the corresponding link key are modified (or ratcheted) to generate new session keys for each communication session. When the accessory communicates with multiple devices and modifies the key for each session, it is possible for the shared link key at a connected device to fall out of sync with the corresponding link key on the accessory device.

In order to synchronize the shared keys, the devices of some embodiments compare counters (also referred to as versions or generations) for the shared link keys between the devices, and ratchets the shared link key until it matches the counter of the corresponding link key at the other device. The ratcheting operation of some embodiments is a one-way function (e.g., a hash) that ensures that previous versions of the key cannot be retrieved, even if the current key is compromised.

The method of some embodiments uses the derived key (derived from the synchronized link keys) to encrypt setup messages exchanged between the connected device and the accessory device. The setup messages of some embodiments include various elements, including entropy values, verification values, and validation values. The verification values (e.g., nonces, accessory IDs, etc.) are used to verify that the sender is who they say they are.

The validation values ensure that the setup message that was sent is the message that was received (i.e., the message was not tampered with). The message of some embodiments includes an encrypted portion and an unencrypted header portion. For example, in some embodiments, the counter that is used to synchronize the link keys is sent in an unencrypted header portion because it is necessary to generate the derived key used to decrypt the encrypted portion. The validation value is used to ensure that neither the encrypted portion, nor the header portion, have been modified since being sent by the sending device.

The entropy values are random (or pseudo-random) values that are generated by each device (i.e., the connected device and the accessory device) to generate a secure, shared session key for the secured communication session. Once the communication session has been established, the method exchanges data encrypted with the shared session key between the devices as a part of the communication session.

In some embodiments, the setup message from the connection device includes the counter used for synchronizing the shared key. As the setup message is encrypted with the key that is derived from the shared key, the counter is included in an unencrypted header of the setup message so that the connected device can use the counter to synchronize the shared link key, derive the derived key, and decrypt the encrypted portion of the setup message.

Upon completion of the communication session, the method modifies (or ratchets) the shared key at each of the devices in a predictable way. The method of some embodiments then stores the modified shared key at each of the devices. The modified shared key cannot be used to decrypt any portion of the encrypted data of the current and previous communication sessions. In some embodiments, the method stores the modified shared key at a connected device by storing the updated shared key and an updated local counter with the cloud service.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1A:
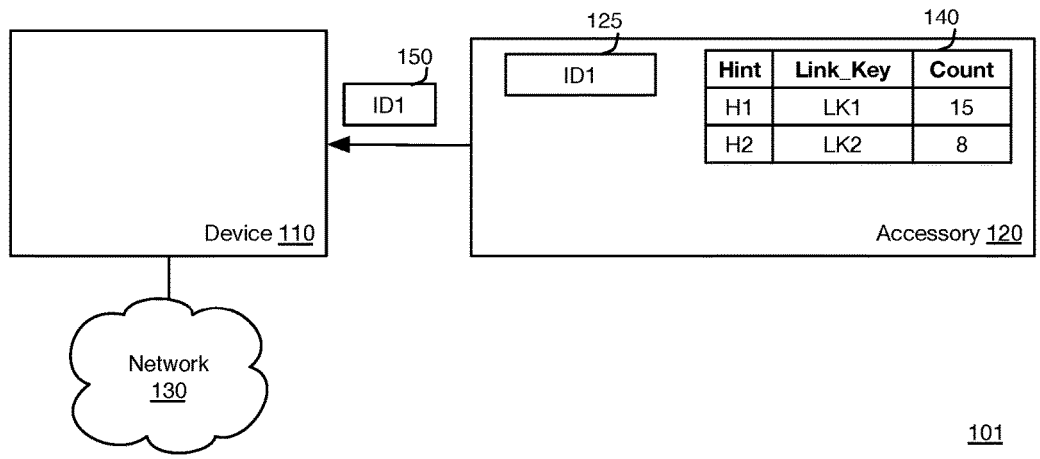
FIGS. 1A-B illustrate an example of a pairing operation between a device and a new accessory device.
Figure 1A:
Figure 1A:
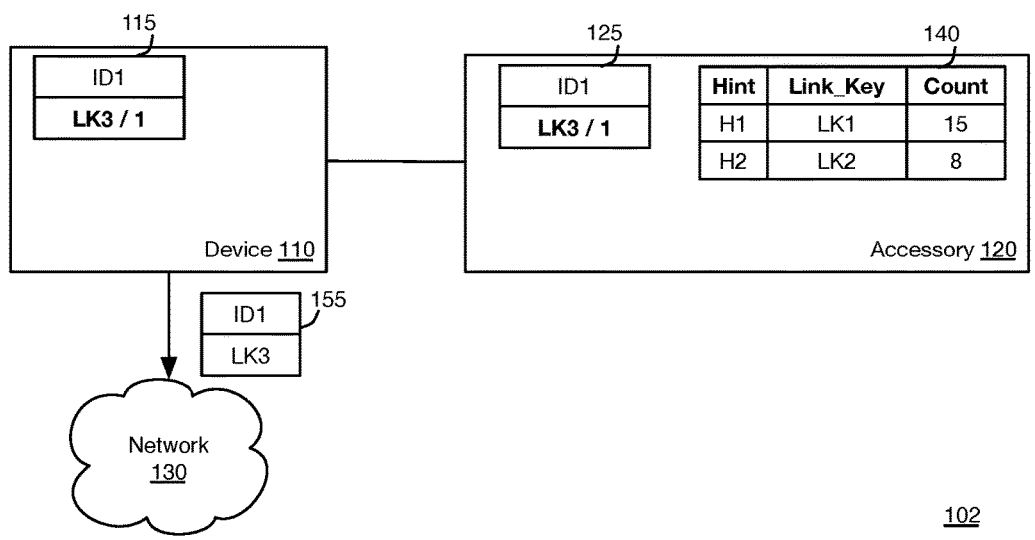
Figure 1A:

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for establishing a secured session with backward security between a first device and a second device. In some embodiments, the method operates to modify and synchronize link keys between two paired devices (e.g., through the Bluetooth protocol) to generate new keys for each communication session between the devices. In some embodiments, prior to establishing the communication session, the method pairs the first device and the second device to generate the initial link keys at the first and second devices and to store the generated link keys as shared link keys.

In some embodiments, at least one of the devices is a connected device that is associated with several other connected devices. The connected devices of some embodiments are associated with a particular user account. The user account of some embodiments is associated with a cloud service that syncs data between the connected devices and provides storage for the synced data. In some embodiments, the cloud service also syncs link keys that are used to establish secure communication sessions with accessory devices.

In some embodiments, an accessory device (e.g., headset, speaker, etc.) can establish communication sessions with the connected devices associated with the particular user account, as well as with other devices that are not associated with the particular user account. In some embodiments, the connected device is a master or source device and the accessory device is a slave or receiving device. The accessory device of some embodiments is a low-power, low-capability (e.g., no input/output, display area, etc.) device.

The method of some embodiments establishes a communication session between the first and second devices using link keys that are stored at each of the devices. The link keys are used by both devices to encrypt and decrypt data that is transmitted between the devices for a specific communication session. In some embodiments, the link keys are initially generated using a secure pairing operation (e.g., Bluetooth Secure Simple Pairing (BT SSP)) between the two devices.

In some embodiments, the link key for a device and a particular accessory is shared between all of the connected devices associated with a user account. In some such embodiments, the link key for the particular accessory is retrieved from a cloud service (e.g., iCloud). When a connected device does not have access to the cloud service, but has made a previous connection with the particular accessory, the device of some embodiments uses a link key that is stored in a local key storage of the device.

In order to establish the secure communication session, some embodiments establish an unencrypted fixed channel between paired devices (a source device and a particular accessory device) by sending an initialization message that includes a key identifier (or hint). In some embodiments, a key identifier is specific to a particular source device and the particular accessory device. Alternatively, or conjunctively, the key identifier of some embodiments identifies a shared link key that is to be used for communication sessions between any of the devices associated with a user account and a particular accessory device. The connected device retrieves or syncs the shared link key from the cloud service, while the accessory device uses the key identifier to retrieve a corresponding link key from a key storage of the second device.

The method of some embodiments uses the shared link key at the connected device and the corresponding link key of the second device to generate a derived key, which is used to exchange one-time setup messages (e.g., to exchange entropy) between the devices to generate secure session keys to be used for the secure communication session. The derived key of some embodiments stretches a 128-bit link key to 256-bits.

In some cases, the shared link key of the connected device and the corresponding link key need to be synchronized before generating the derived key (i.e., when the shared link key and the corresponding link key do not match). In some embodiments, the shared link key and the corresponding link key are modified (or ratcheted) to generate new session keys for each communication session. When the accessory communicates with multiple devices and modifies the key for each session, it is possible for the shared link key at a connected device to fall out of sync with the corresponding link key on the accessory device.

In order to synchronize the shared keys, the devices of some embodiments compare counters (also referred to as versions or generations) for the shared link keys between the devices, and ratchets the shared link key until it matches the counter of the corresponding link key at the other device. The ratcheting operation of some embodiments is a one-way function (e.g., a hash) that ensures that previous versions of the key cannot be retrieved, even if the current key is compromised.

The method of some embodiments uses the derived key (derived from the synchronized link keys) to encrypt setup messages exchanged between the connected device and the accessory device. The setup messages of some embodiments include various elements, including entropy values, integrity values, and validation values. The verification values (e.g., nonces, accessory IDs, etc.) are used to verify that the sender is who they say they are.

The validation values ensure that the setup message that was sent is the message that was received (i.e., the message was not tampered with). The message of some embodiments includes an encrypted portion and an unencrypted header portion. For example, in some embodiments, the counter that is used to synchronize the link keys is sent in an unencrypted header portion because it is necessary to generate the derived key used to decrypt the encrypted portion. The validation value is used to ensure that neither the encrypted portion, nor the header portion, have been modified since being sent by the sending device.

The entropy values are random (or pseudo-random) values that are generated by each device (i.e., the connected device and the accessory device) to generate a secure, shared session key for the secured communication session. Once the communication session has been established, the method exchanges data encrypted with the shared session key between the devices as a part of the communication session.

In some embodiments, the setup message from the connection device includes the counter used for synchronizing the shared key. As the setup message is encrypted with the key that is derived from the shared key, the counter is included in an unencrypted header of the setup message so that the connected device can use the counter to synchronize the shared link key, derive the derived key, and decrypt the encrypted portion of the setup message.

Upon completion of the communication session, the method modifies (or ratchets) the shared key at each of the devices in a predictable way. The method of some embodiments then stores the modified shared key at each of the devices. The modified shared key cannot be used to decrypt any portion of the encrypted data of the current and previous communication sessions. In some embodiments, the method stores the modified shared key at a connected device by storing the updated shared key and an updated local counter with the cloud service.

Many examples of the session protocol are described below. Section I describes a session protocol that provides backward security for encrypted communications between a set of paired devices. Section II describes an example of an electronic system that implements some embodiments described herein.

I. Session Protocol for Backward Security

Some embodiments of the invention provide a session protocol for establishing a secured session with backward security between a set of paired devices. The protocol modifies and synchronizes link keys between the paired devices to generate new keys for each communication session between the devices. In some embodiments, prior to establishing the communication session, the method pairs the first device and the second device to generate the initial link keys at the first and second devices and to store the generated link keys as shared link keys.

A. Pairing Devices

Pairing of a pair of devices creates a shared secret (or link key) that can be used to encrypt (or to generate other keys used to encrypt) data communicated between the devices. In some embodiments, the link keys are also stored (e.g., in a local key storage, in a cloud key storage, etc.) for both devices so that the link keys can be re-used for future communication sessions without having to repeat the pairing process.

Many accessories are able to pair with multiple devices, but as the number of devices that each user owns increases, the number of keys that need to be stored increases as well. Particularly in low-power and low-capability devices, storing link keys for several devices does not scale well. In some embodiments, an accessory device only stores a single link key at a time, and each new time a new connection is initiated from a different device, it requires a new pairing. It is inconvenient to have to continually re-pair accessory devices with the different devices owned by a particular user. In addition, it would be convenient if pairing an accessory with a single device of a user allowed the accessory to be automatically paired with any connected device associated with the user.

In some embodiments, at least one of the devices is a connected device that is associated with several other connected devices. For example, the connected devices of some embodiments are associated with a user account that provides a cloud pairing feature of a cloud service. With a cloud pairing feature, in addition to pairing with multiple different devices, an accessory is able to pair with multiple devices in each cloud account without having to re-pair with each device. In some embodiments, the protocol modifies the link keys for each communication session and the cloud service syncs the link keys that are used to establish secure communication sessions with accessory devices.

Figure 1B:
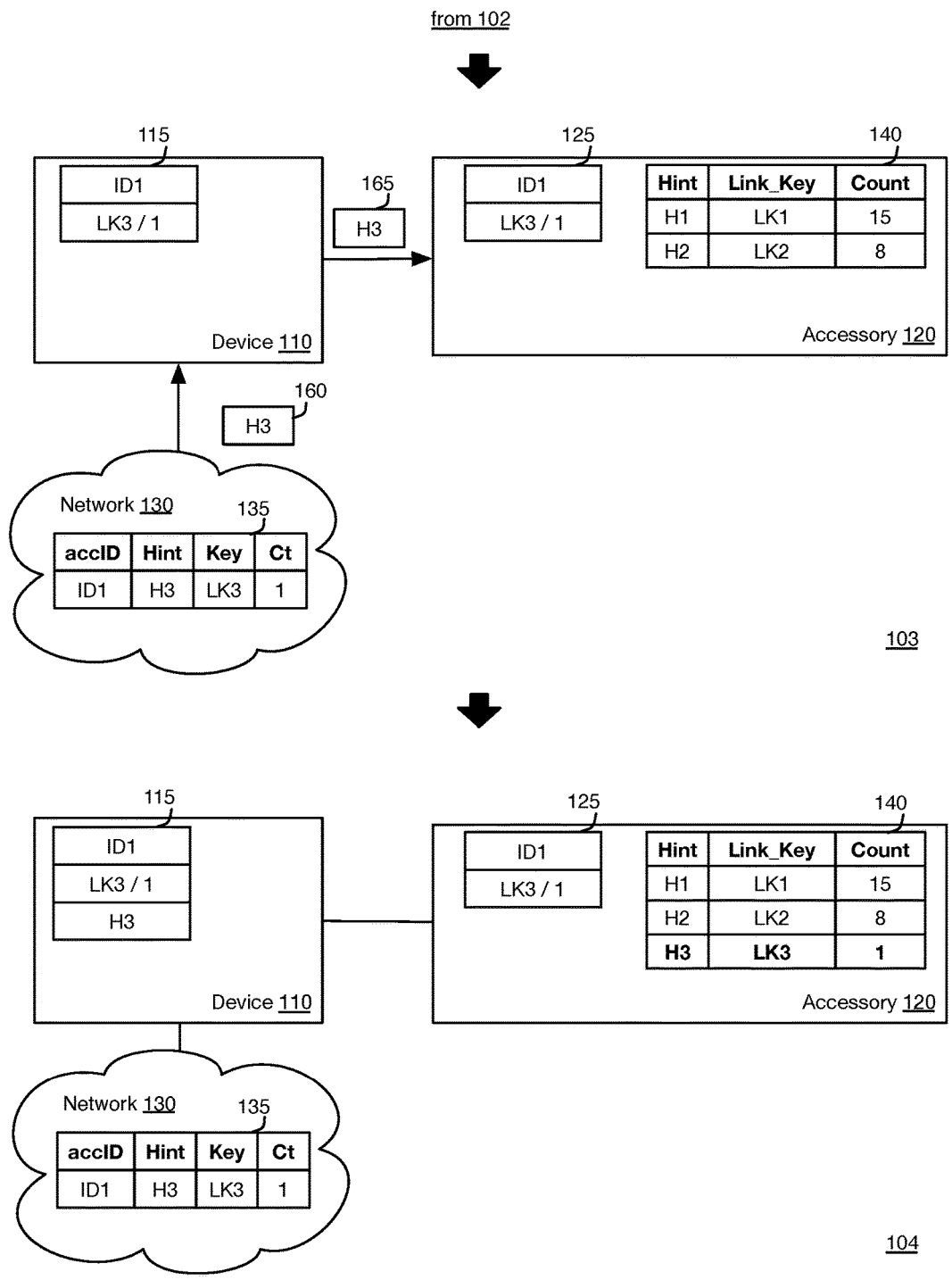

FIGS. 1A-B illustrate an example of a pairing operation between a device and a new accessory device in four stages 101-104. The first stage 101 shows an accessory device 120 (e.g., an earbud, wireless speaker, etc.) that initiates a pairing (and bonding) operation with a source device 110. In some embodiments, accessory 120 includes a key table 140 for storing link keys for different source (or master) devices.

The device 110 of some embodiments is a master (or source) device (e.g., mobile phone, media player, computer, etc.) that controls one or more accessory (or slave) devices (e.g., audio headsets, etc.). In this example, the device 110 is a device that is connected to a network (or cloud service) 130. In some embodiments, the network 130 represents a cloud service that shares data for multiple connected devices associated with a user (e.g., through a common user account), and device 110 is one of the cloud-connected devices that is associated with the user account in the cloud.

For example, a user may have several devices (e.g., a mobile phone, tablet, laptop computer, etc.) that are all associated with a user account (e.g., an account with a cloud service). In some embodiments, all of the devices use a same shared link key when each of those devices connects with a particular accessory. This provides a shared link key to a device that has not yet paired with an accessory, without having to go through another pairing process. In this example, however, none of the associated devices of the user have previously connected to accessory 120, so there is no shared link key for accessory 120 for this user.

The first stage 101 shows that the accessory device 120 initiates a pairing operation with device 110. In this example, the pairing operation is initiated with a message 150 that includes a device identifier ID1 for accessory 120. The connection message 150 of some embodiments is a broadcast message that allows nearby devices to identify available accessory devices. In some embodiments, the device identifier ID1 is a unique identifier (e.g., BD_ADDR) that is associated with each device by a manufacturer for the device.

The second stage 102 shows that the device 110 and accessory 120 have gone through an initial pairing operation and have created a shared secret (or link key) LK3. The shared secret can be generated using various methods (e.g., Diffie-Hellman, etc.) that are known in the art. The shared secret can be used for encrypting data in a secured communication session between the paired devices.

In this example, the device 110 is a cloud-connected device that shares link keys for different connected devices associated with a particular user. In some embodiments, device 110 uses the link key LK3 as the shared link key for all of the particular user's devices. For example, a user may generate a shared link key when pairing the user's phone with a headset, and may be able to use the same shared link key when connecting the user's tablet with the same headset, without having to generate (and store) a new link key for each device.

The second stage 102 shows that connected device 110 has stored the accessory's identifier ID1 and the generated link key LK3 in a local memory 115. The second stage 102 also shows that the cloud-connected device 110 sends a message 155 with the accessory's identifier ID1 and the generated link key LK3 to be stored in the network 130.

In the third stage 103, the network 130 stores the shared link key LK3, the accessory ID ID1, and a counter associated with the shared link key LK3 in a cloud key storage 135. The cloud key storage 135 of some embodiments is a part of a cloud storage used for storing shared link keys for connected devices. The counter, of some embodiments, indicates a version or generation number for the key LK3. The protocol of some embodiments provides for ratcheting of the link keys to change the link key for each communication session. The counter indicates the number of times the key has been ratcheted. Ratcheting of the keys to synchronize the link keys will be described in further detail below with reference to FIG. 5.

The cloud key storage 135 also associates a hint (also referred to as a key identifier) H3, which identifies, for the particular user account, the link key for the particular accessory ID. The key storages (e.g., the cloud key storage, the accessory device's key storage, etc.) of some embodiments store keys generated from pairing with multiple devices. The key storages of some embodiments map the hint to the shared link key so that when a device (e.g., any device associated with the particular user account) uses the hint to initiate a communication session, the accessory can retrieve a corresponding link key to generate a shared session key for the communication session.

In this example, the hint is associated with the shared session key at the cloud key storage 135, but in other embodiments, the hint is associated with the session key by the device 110 or accessory 120. In such embodiments, the hint is shared with the other device and/or network 130.

The third stage 103 also shows that the network 130 returns a message 160 with the hint H3 to the device 110, which sends message 165 with the hint H3 to the accessory 120. The hint serves as a common identifier for the shared link key in both the cloud key storage 135 and the key table 140 of accessory 120.

Finally, in the fourth stage 104, accessory 120 stores a new record in the key table 140 for the new hint-key combination. At this point, the accessory 120, device 110, and network 130 have shared a link key LK3 with a counter of 1, associated with hint H3 for the user of device 110.

Figure 2:
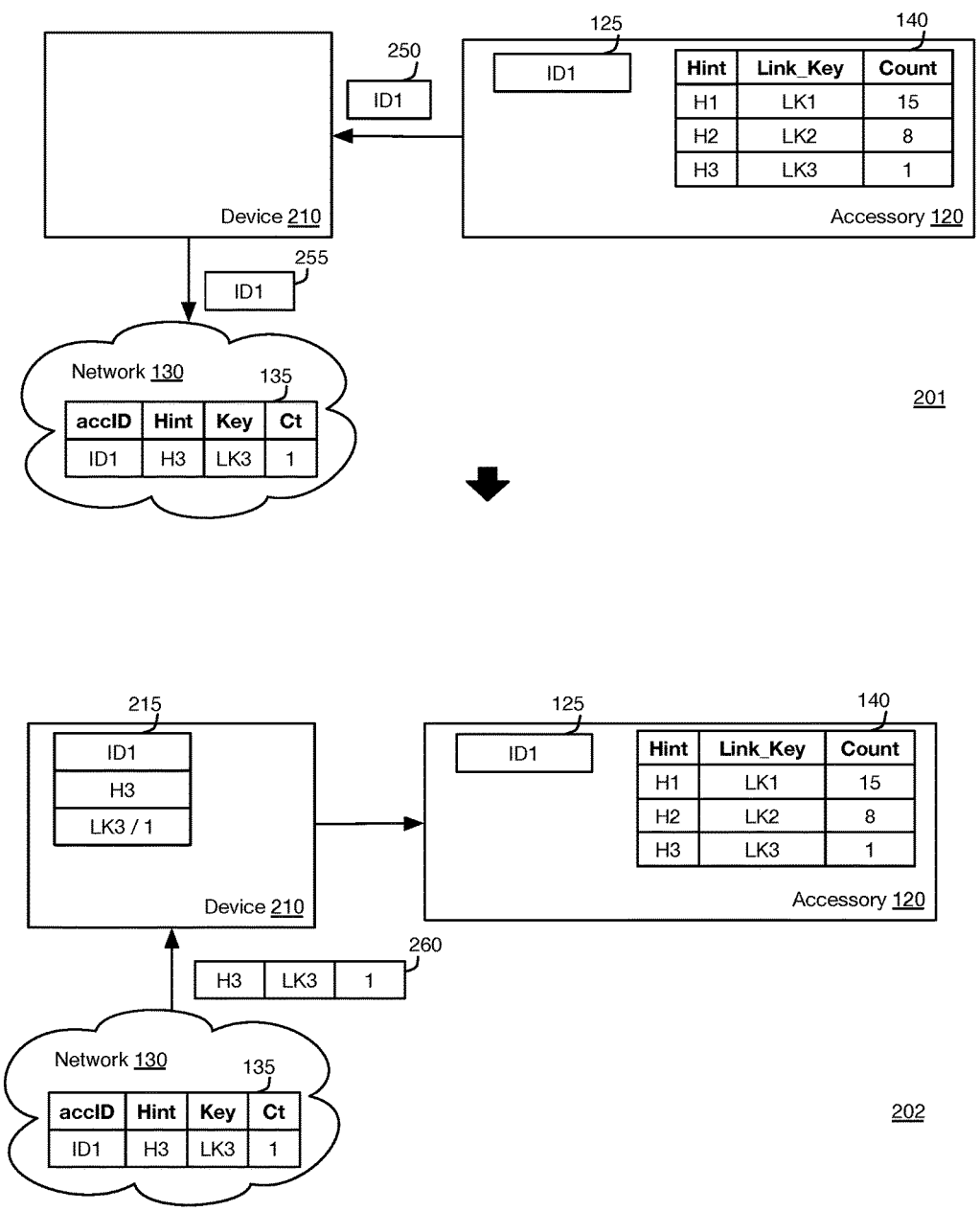
FIG. 2 illustrates an example of a pairing operation between a related device and the accessory device.

When an accessory already has a key associated with a particular user account, but needs to pair with another connected device (associated with the particular user account) that has not yet paired with an accessory, a different pairing operation is used to share a link key already associated with the user account. FIG. 2 illustrates an example of a pairing operation between a related device and the accessory device in two stages 201 and 202. The first stage 201 shows accessory 120 and network 130 as described above with reference to FIG. 1. In this example, accessory 120 pairs with a new connected device 210 by sending an initialization message 250 with the accessory identifier ID1. Device 210 is another device associated with the same user and user account of device 110 of FIG. 1.

The first stage 201 also shows that device 210 sends a message 255 with the accessory ID ID1 to the network 130. However, in this case, as accessory 120 has already paired with another related connected device (i.e., device 110) associated with the same user account, the cloud key storage 135 already stores a link key LK3 (and associated data) associated with the particular accessory 120 in cloud key storage 135. The cloud key storage 135 of some embodiments stores shared link keys for several different accessory devices used by connected devices associated with the user account.

In the second stage 202, device 210 receives information 260 for the shared link key LK3 from the cloud key storage 135. The information includes the hint (or key identifier) H3, link key LK3, and a counter 1. The second stage 202 shows that both the device 210 and accessory 120 now have the link key LK3. The devices 210 and 120 then use the link key LK3 to generate a session key for encrypting communication sessions between the device 210 and accessory 120.

Figure 3:
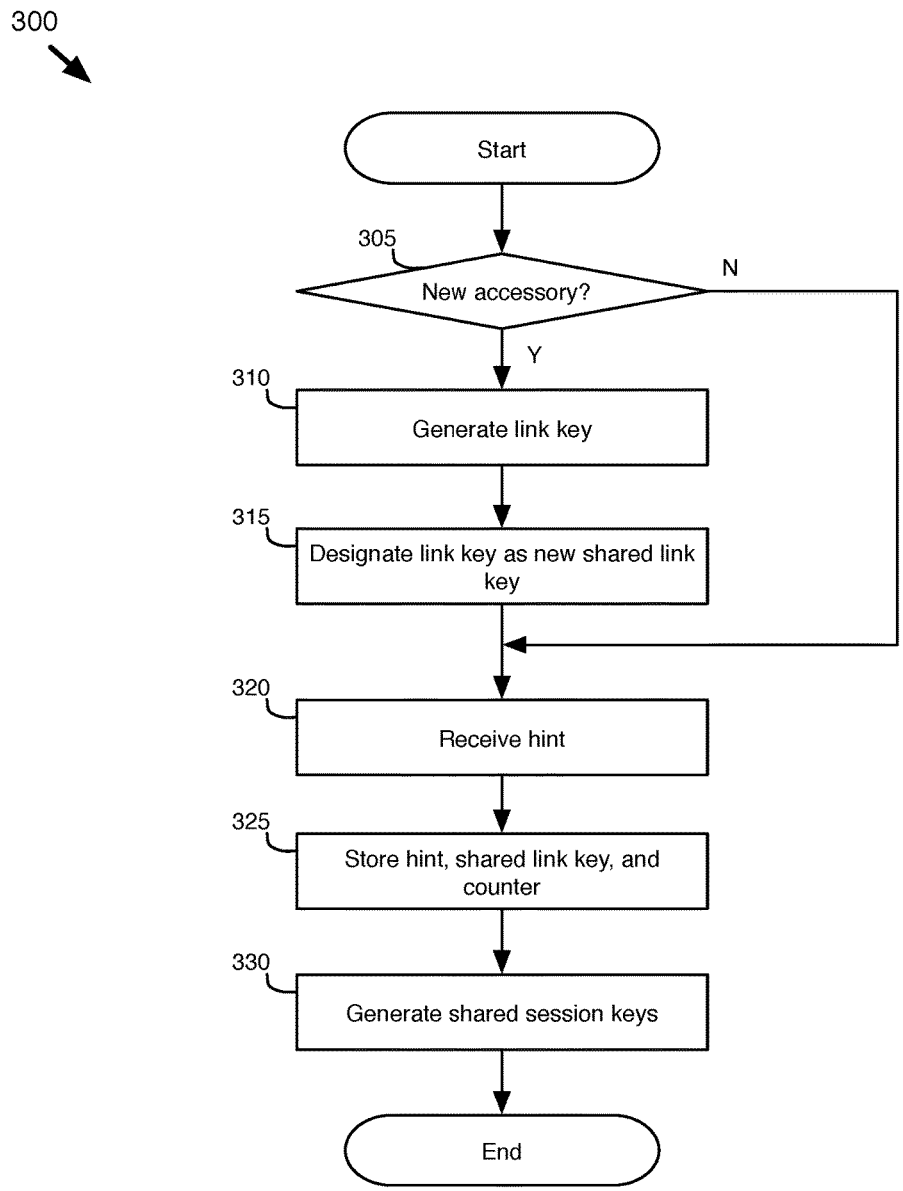
FIG. 3 conceptually illustrates a process for pairing an accessory with a connected device.

FIG. 3 conceptually illustrates a process for pairing an accessory with a connected device. The process 300 of some embodiments is performed by a connected device associated with a particular user account that pairs with an accessory. The process 300 begins by determining (at 310) whether the accessory is a new accessory to the particular user account, i.e., whether a shared link key has already been stored (e.g., in a cloud key storage) for the accessory.

When the process 300 determines (at 310) that the accessory is new to connected devices of the particular user account, the process 300 generates (at 310) a shared link key with the device. In some embodiments, the shared link key is generated using a secure process for generating a shared secret, such as Diffie-Hellman.

The process then designates (at 315) the generated link key as the new shared link key. The new shared link key is used for future communication sessions between the accessory and any of the connected devices associated with the particular user account. In some embodiments, the process 300 designates (at 315) the generated link key as a shared link key by storing the generated link key (and other associated data) in a cloud key storage. In some embodiments, the associated data includes a counter and a mapping to a hint, or key identifier, specified for the link key. The hint of some embodiments is a 128-bit static number associated with the user account at the cloud service.

When the process 300 determines (at 305) that the accessory is not new or after the link key has been designated (at 315) as a new shared link key, the process 300 receives (at 320) a hint associated with the shared link key from a network storage (e.g., cloud key storage). The process 300 stores (at 325) the hint, shared link key, and counter at the device and generates (at 330) the shared session keys based on the stored data. Generating shared session keys using the link keys is described in further detail below.

B. Generating a Shared Session Key

Figure 4A:
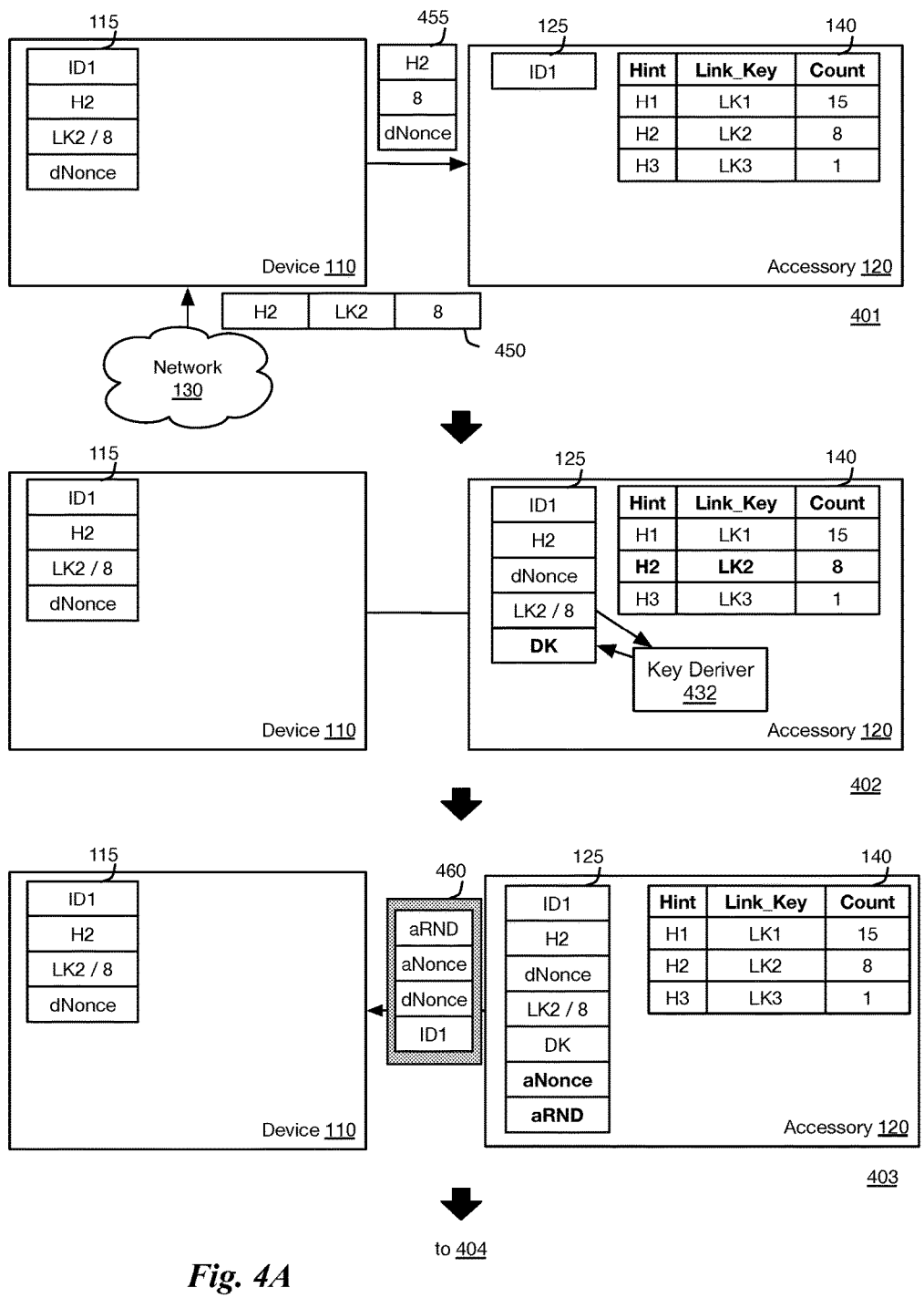
FIGS. 4A-C illustrate an example of generating a shared session key between a pair of devices.
Figure 4B:
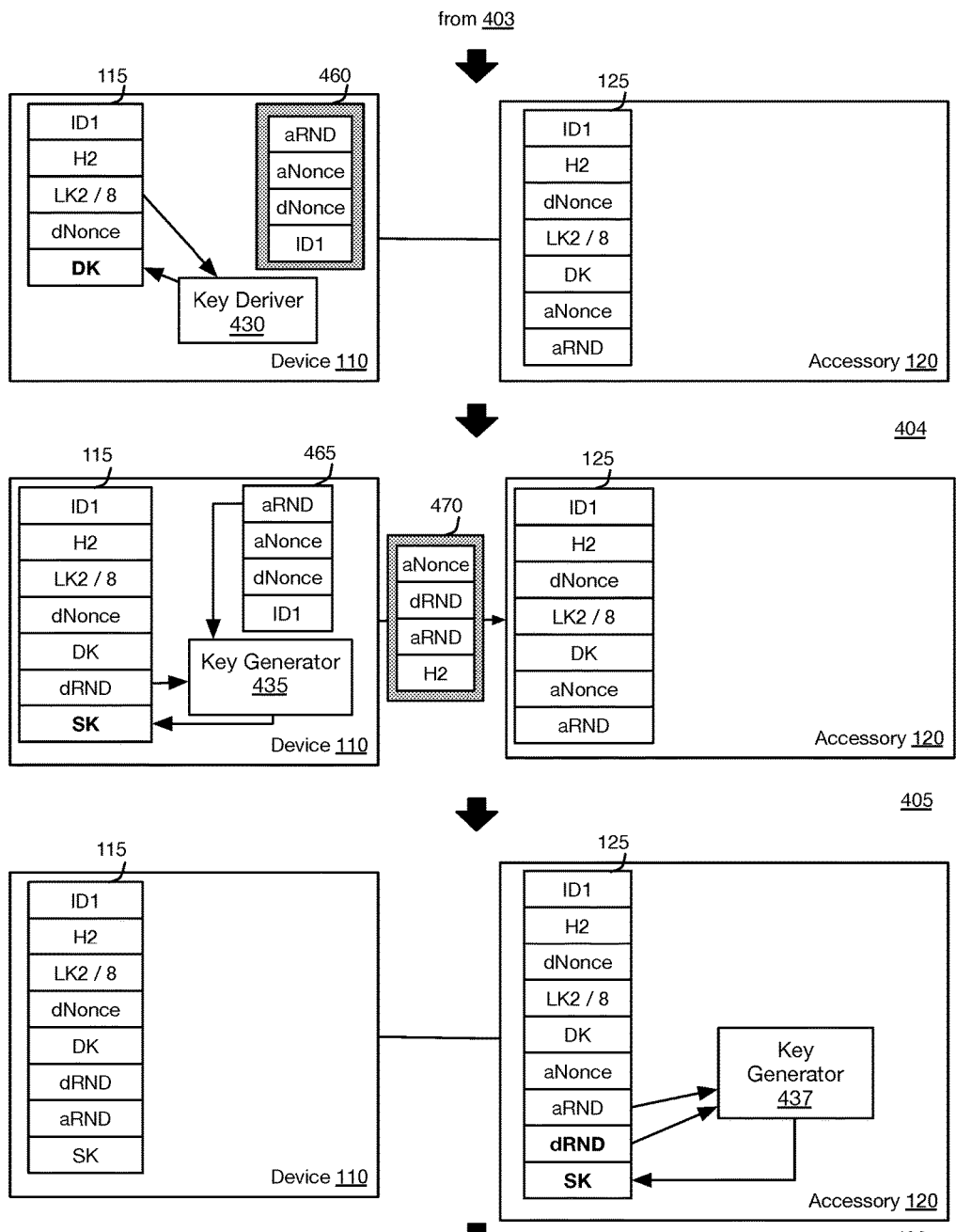
Figure 4C:
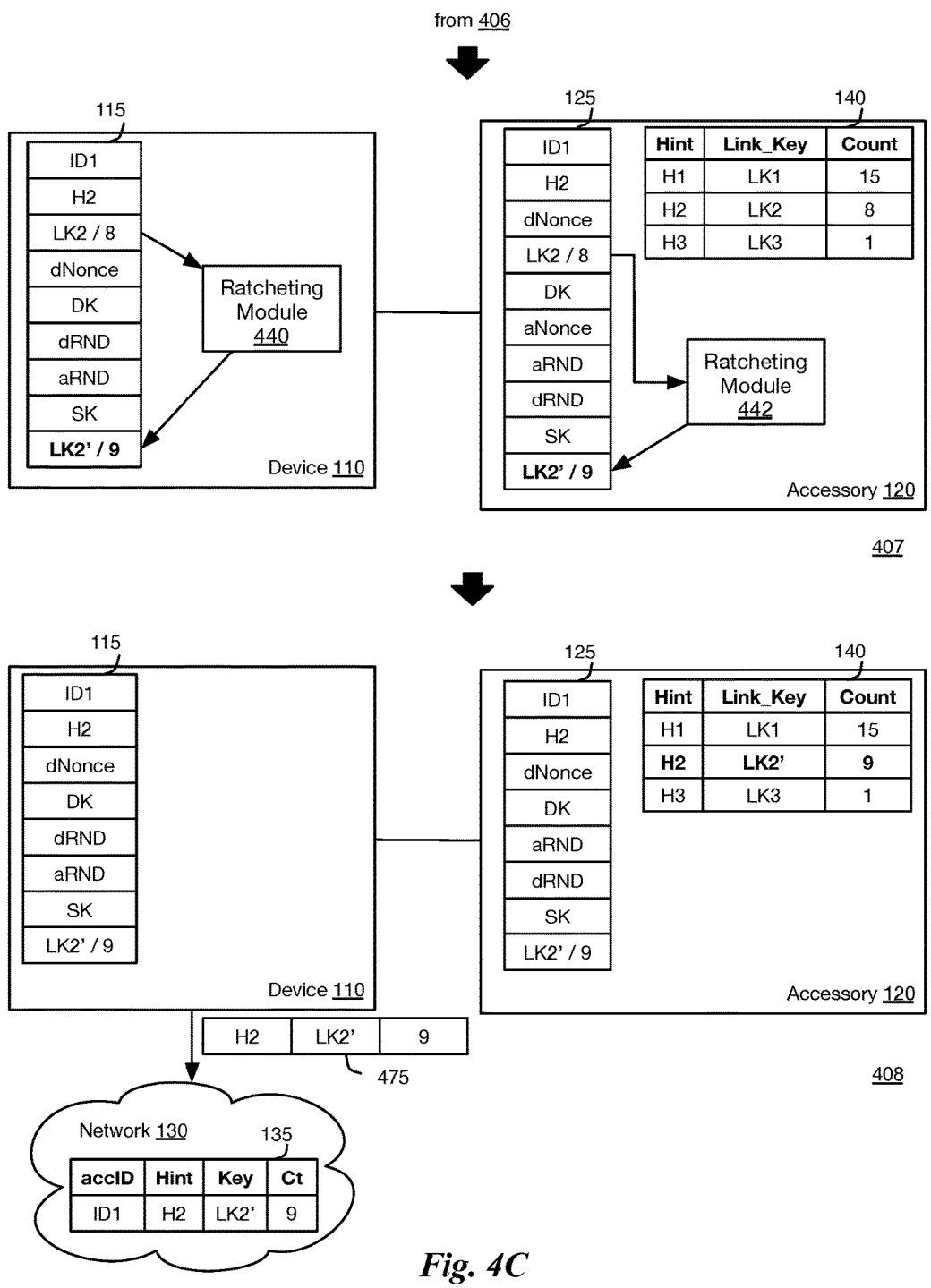

FIGS. 4A-C illustrate an example of generating a shared session key between a pair of devices in eight stages 401-408. The first stage 401 shows a connected device 110 and accessory 120 that have been paired as described in the examples above. Device 110 receives data 450 with hint H2 and link key LK2 and stores it in a storage 115 with various information for communicating with accessory 120. In some embodiments, some of the data in the device's storage 115 is populated with the data 450 that is retrieved from network 130. Use of a shared link key when a device is not connected to the network 130 is described with reference to FIG. 5 below. Accessory 120 includes a memory 125 and a key table 140 with keys LK1-LK3, associated with hints H1-H3 respectively.

In the first stage 401, device 110 initiates a communication session with accessory 120 by sending message 455 with the hint H2 and a device nonce dNonce to accessory 120. The nonces of some embodiments are random (or pseudo-random) numbers that is sent back and forth between the device 110 and the accessory 120 in a series of setup messages. The nonces of some embodiments are used to verify and validate the setup messages, which are used to set up the communication session. In some embodiments, the hint H2 and device nonce dNonce are initially sent by the master device 110 to the accessory device 120 over an unencrypted fixed channel that is established as a part of the communication protocol (e.g., Bluetooth).

In some embodiments, the message 455 also includes the counter (i.e., 8) associated with the link key LK2. The counter of some embodiments is used to ratchet a corresponding link key at the accessory 120 to synchronize the corresponding link key with the link key at the device 110. In most cases, the corresponding link key at the accessory 120 should be the most current version of the shared link key, because it is ratcheted after every communication session, regardless of which connected device it is communicating with. However, in some cases, the corresponding link key at the accessory 120 may lag behind the link key at device 110 when the link key is ratcheted at the device 110 but the corresponding key at the accessory 120 is not. This may occur when the accessory fails prior to ratcheting or storing the ratcheted key in the key table 140. In such cases, accessory 120 ratchets the corresponding link key from the key storage table 140 to match the shared link key at device 110.

The second stage 402 shows that accessory 120 has received message 455 with the hint H2 and the device nonce dNonce from device 110. Based on the received hint H2, accessory 120 retrieves link key LK2 with a counter of 8 from the link key storage 140. The second stage 402 also shows that key deriver 432 uses the retrieved link key LK2 to derive a derived key DK. In some embodiments, the derived key DK of some embodiments is derived using a deterministic encryption function with a predictable result and a set of constant values (e.g., DK=AES-ECB(acc_key, "bt_aessivauthent"||"bt_aessivencrypt")). In some embodiments, link key LK2 is a 128-bit key and the encryption function is used to stretch link key LK2 to a 256-bit derived key DK.

In the third stage 403, accessory 120 has generated an accessory nonce aNonce, and accessory entropy aRND. Accessory nonce aNonce, similar to the corresponding device nonce dNonce, is a random (or pseudo-random) value used to verify and validate messages sent between the devices. Accessory entropy aRND is a random (or pseudo-random) number that is used (along with entropy generated by the device) to eventually generate the shared session key.

The third stage 403 also shows that accessory 120 sends encrypted data 460 to device 110. The data 460 is encrypted using the derived key DK and includes accessory entropy aRND, accessory nonce aNonce, device nonce dNonce received from device 110, and the device identifier ID1 for the accessory 120.

In some embodiments, the encrypted data 460 is encrypted with the derived key DK using a deterministic authenticated encryption operation (e.g., AES-SIV), which provides for authentication of the message through a validation value V, as well as a header (not shown) (e.g., AES-SIV(DK, aRND||dNonce||accessoryID), V). The validation value of some embodiments is a checksum or hash of the message to verify that the contents of a message have not been modified or tampered with by an attacker.

The fourth stage 404 shows that device 110 has received the encrypted data 460. The fourth stage 404 also shows that device 110 uses key deriver 430 to derive the derived key DK from the shared link key LK2 that was received from the network 130. The key deriver 430 uses the same process as the key deriver 432 to generate a matching derived key DK.

As described above, the shared link key LK2 at the device may not match the corresponding link key LK2 at the accessory 120. The link keys are modified (or ratcheted) at various points in the process to provide backward security for each communication session. However, due to the use of a shared link key across multiple devices and/or other complications during the process, the shared link key LK2 at device 110 may not match with the link key at accessory 120 and may need to be synchronized or otherwise reconciled (at either the accessory or the connected device) before generating the derived key DK. The reconciliation of mismatched keys is described in further detail below with reference to FIGS. 5A-B.

The fifth stage 405 shows that device 110 has decrypted the encrypted data 460 to access the decrypted data 465. The decrypted data 465 includes the accessory entropy aRND, accessory nonce aNonce, device nonce dNonce, and accessory ID ID1. The device 110 verifies that the device nonce received in the decrypted data 465 matches the device nonce previously sent to the accessory 120.

In the fifth stage 405, device 110 has also generated device entropy dRND. Like the accessory entropy aRND, device entropy dRND is a random (or pseudo-random) number used for generating the session key. Key generator 435 of device 110 uses the accessory entropy aRND received from accessory 120 and the generated device entropy dRND to generate session key SK.

In some embodiments, the key generator 435 uses a deterministic encryption function (e.g., AES-ECB(dRND, aRND) XOR AES-ECB(aRND, 0)) to generate the session key SK. The key generator 435 of some embodiments XORs the result of the deterministic encryption key with the result of a constant encrypted with the accessory entropy (e.g., AES-ECB(aRND, 0)) in order to prevent either party of the protocol (e.g., the connected device or the accessory device) from choosing the final value of the key. For example, without the additional XOR operation with the encrypted values, a connected device may attempt to use a specific dRND to result in a desired final value for the key. By encrypting the various values (i.e., a constant value (e.g., 0), the accessory entropy aRND, and device entropy dRND), it becomes impossible for the connected device to identify a special device entropy dRND that would result in such a desired key. The connected device would have to generate a dRND such that AES-ECB(dRND, aRND)==SpecialValue. Identifying such a dRND would be the same problem as identifying a key based on a known plaintext and resulting ciphertext, which is the security guarantee of a block cipher. For the accessory device, the accessory entropy aRND is chosen before it receives the device entropy dRND, so there is no similar concern.

The fifth stage 405 also shows that device 110 sends an encrypted message 470 back to accessory 120. The encrypted message 470 is encrypted using the derived key DK and again includes hint H2 originally provided to the accessory, as well as accessory nonce aNonce, device entropy dRND and accessory entropy aRND. Like the encrypted data 460 sent by the accessory 110, the encrypted message 470 is encrypted with the derived key DK using a deterministic authenticated encryption operation (e.g., AES-SIV), which provides for authentication of the message through a validation value V, as well as a header (not shown) (e.g., AES-SIV(DK, dNonce||dRND||aRND||hint), V).

In the sixth stage 406, decrypts the encrypted message 470 and verifies the contents of the encrypted message 470 received from device 110. Accessory 120 of some embodiments verifies elements of message 465 to verify that message 465 was sent by device and that the message 465 has not been tampered with by an attacker (e.g., a man in the middle (MITM) attack). In this example, accessory 120 verifies that the accessory nonce in the encrypted data matches the accessory nonce previously sent by the accessory 120. The sixth stage 406 also shows that key generator 437 of accessory 120 uses the device entropy dRND received from device 110 and accessory entropy aRND (generated by accessory 120) to generate a matching session key SK at accessory 120.

At this point, each of the devices has a shared session key SK. The shared session key SK is used for encrypting and decrypting data of a secured communication session between the device 110 and accessory 120. In some embodiments, once the communication session is complete, both the device 110 and accessory 120 will ratchet (or modify) the shared link keys stored on the devices so that data from any previous communication session cannot be decrypted, even if the link keys stored on the devices are compromised (e.g., through a physical brute force attack). The ratchet mechanism allows the accessory 120 to delete old link keys for each communication session and to use a new link key for subsequent connections. In some embodiments, the ratcheting modifies the existing link keys to generate a new version of the link keys that cannot be used to expose previous versions of the link keys. This provides backward security because any past sessions cannot be decrypted even if the current keys are compromised.

The seventh stage 407 shows that once a communication session has ended, both the device 110 and accessory 120 use ratcheting modules 440 and 442 to ratchet the shared link key LK2 to a new version of the link key LK2', as well as an incremented counter 9. Both devices are able to perform the same ratcheting operation, so each device ends up with the same link key, without needing to exchange any additional information. The ratcheting operation of some embodiments is a one-way function (i.e., a function that cannot be reversed) that is used to advance a key through different versions or generations, without providing any way for recovering previous versions of the key.

The eighth stage 408 shows that the devices store the updated link keys LK2' with the incremented counters. The previous versions of the link keys are deleted permanently. Accessory 120 updates the link key LK2' and counter 9 in the key table 140. The device 110 stores (through message 475) the updated link key LK2' and incremented counter 9 with hint H2 to the cloud key storage 135. When another connected device associated with the user account syncs with the network 130 to communicate with the accessory device, it will use the ratcheted link key LK2'.

However, in some cases, the connected source device is unable to sync with the cloud service and may store an old version of the link key. For example, the source device may lose access to the network (e.g., on a plane, in an area without network coverage, etc.). In such a case, the counter associated with the corresponding link key of the accessory device may differ from the counter associated with the shared link key of the source device.

Figure 5A:
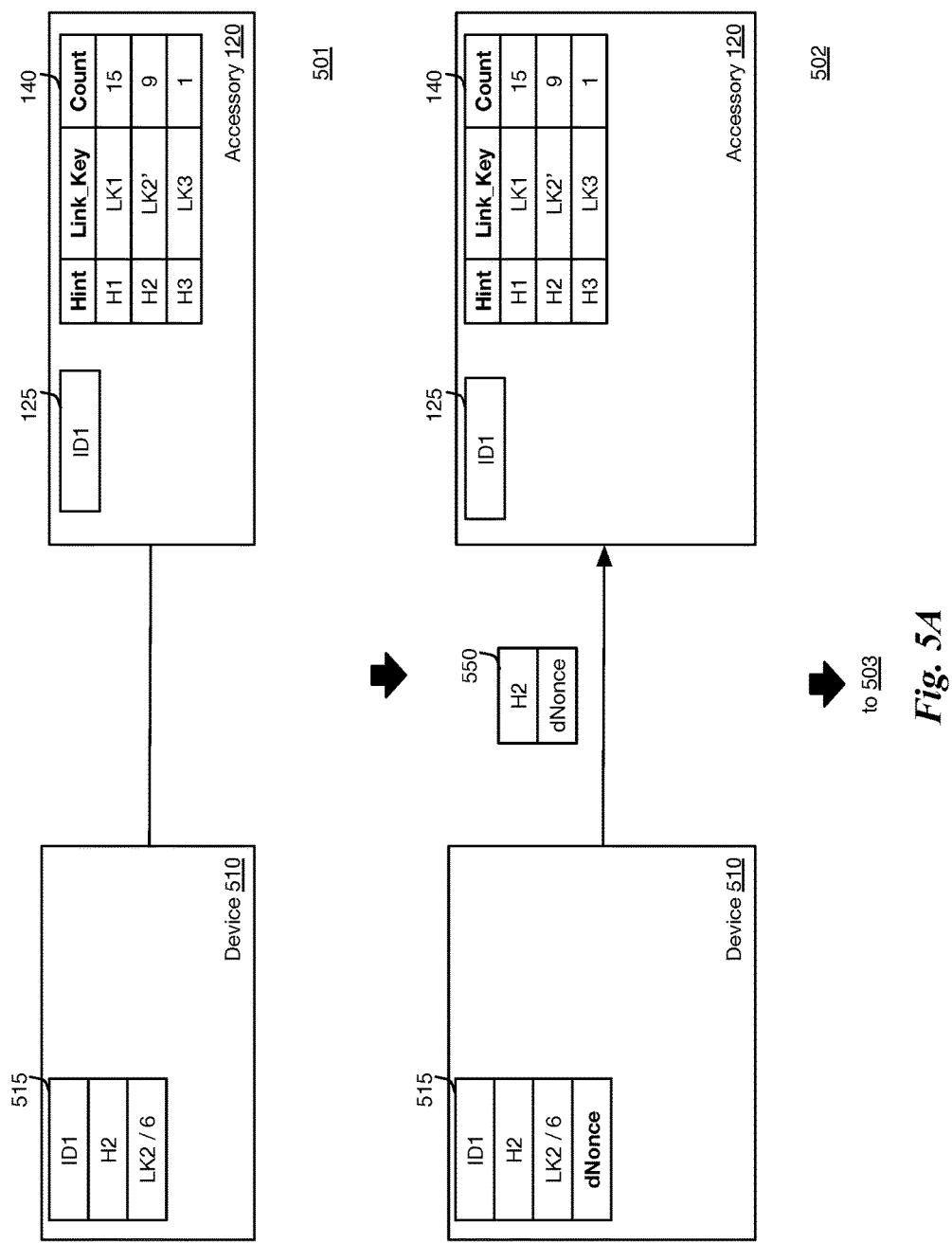
FIGS. 5A-B illustrate an example of ratcheting to provide backward security for a communication session.
Figure 5B:
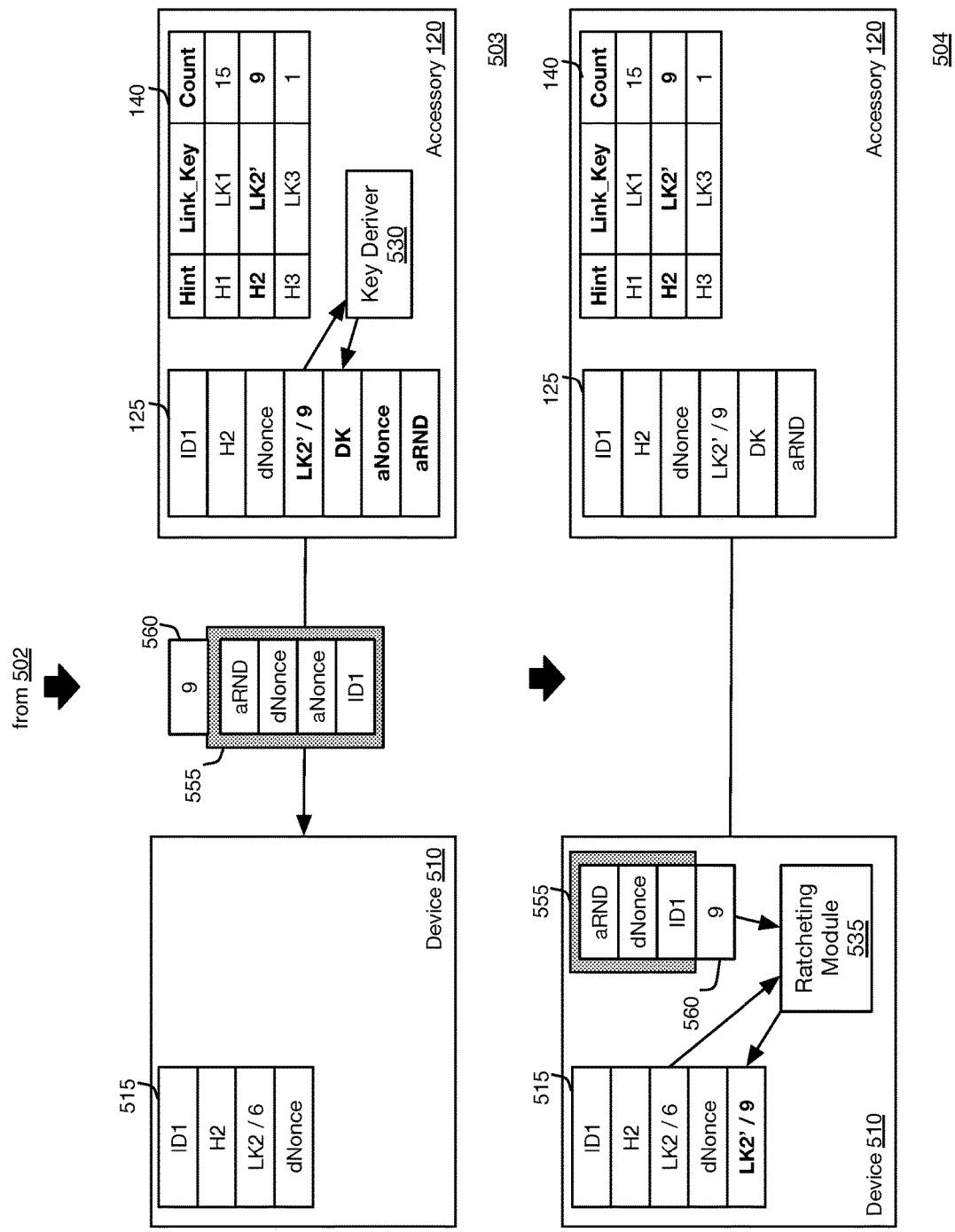

Some embodiments provide a mechanism for a device to connect and derive a key for an accessory, even when it does not have access to the cloud. FIGS. 5A-B illustrate an example of ratcheting to provide backward security for a communication session in four stages 501-504. The first stage 501 shows device 110 and accessory 120 after they have established a channel. In some embodiments, the channel is an unencrypted fixed channel that is established prior to a secure communication session.

In the first stage 501, device 510 stores information 515 for a link key LK2 associated with accessory 120 for a particular user account associated with the device 510. The information 515 includes a hint H2, a shared link key LK2, and a counter 6. In this example, unlike the example of FIG. 4, the shared link key LK2 stored at the device 510 is different from the corresponding link key LK2' with counter 9 stored at accessory 120. This can occur when a device pairs with other devices associated with the shared link key. When the communication sessions with the other devices end, each of the devices ratchets the key and updates the ratcheted key associated with the account. Meanwhile, the key stored on device 510 has not been ratcheted and will remain out of sync, until it is synchronized with the network 130 (e.g., when the device initiates another connection with the accessory while connected to the cloud service).

The second stage 502 shows that device 510 sends a message 550 to accessory 120. Similar to the example described above with reference to FIG. 4, the second stage 502 shows that message 550 includes the hint H2 and a device nonce dNonce generated by device 110, and the third stage 503 shows that accessory 120 responds with an encrypted message 555. However, in this example, the encrypted message 555 also includes an unencrypted header 560 that contains the counter 9.

The fourth stage 504 shows the encrypted portion 555 (encrypted with a derived key based on the shared link key) and the unencrypted header 560 with the counter 9. Ratcheting module 535 of device 510 uses the stored shared key LK2 with counter 6, and the counter 9 received in the unencrypted header from accessory 120, to generate an updated shared key LK2' with incremented counter 9. The stored shared key LK2 is ratcheted based on the counters stored at the device 510 and received from the accessory 120. In this example, the ratcheting module 535 ratchets the shared key LK2 three times, incrementing the counter, to synchronize the shared keys at the device 110 and the accessory device 120. The ratcheted key LK2', with counter 9, now matches the corresponding link key LK2' at accessory 120 and is then used to generate the derived key to decrypt the encrypted message 555. In some embodiments, in order to ensure that the counter is not tampered with, the encrypted message 555 of some embodiments is encrypted with a validation value (e.g., a checksum) that is used to validate the integrity of the header 560 and the encrypted portion 555.

In some cases, the devices include specialized hardware for generating an ephemeral shared secret (e.g., using Diffie-Hellman). As described above, ephemeral shared secrets allow for a higher level of security, providing both backward and forward security. However, the specialized hardware often has higher power requirements or, due to the complexity of generating ephemeral shared secrets, can create inconvenient time lags when connecting to an accessory. Particularly in low-power, low-capability devices, the power and/or processing requirements are burdensome. Some embodiments of the invention provide for a hybrid method that provides for better performance and good security for such devices.

Figure 6:
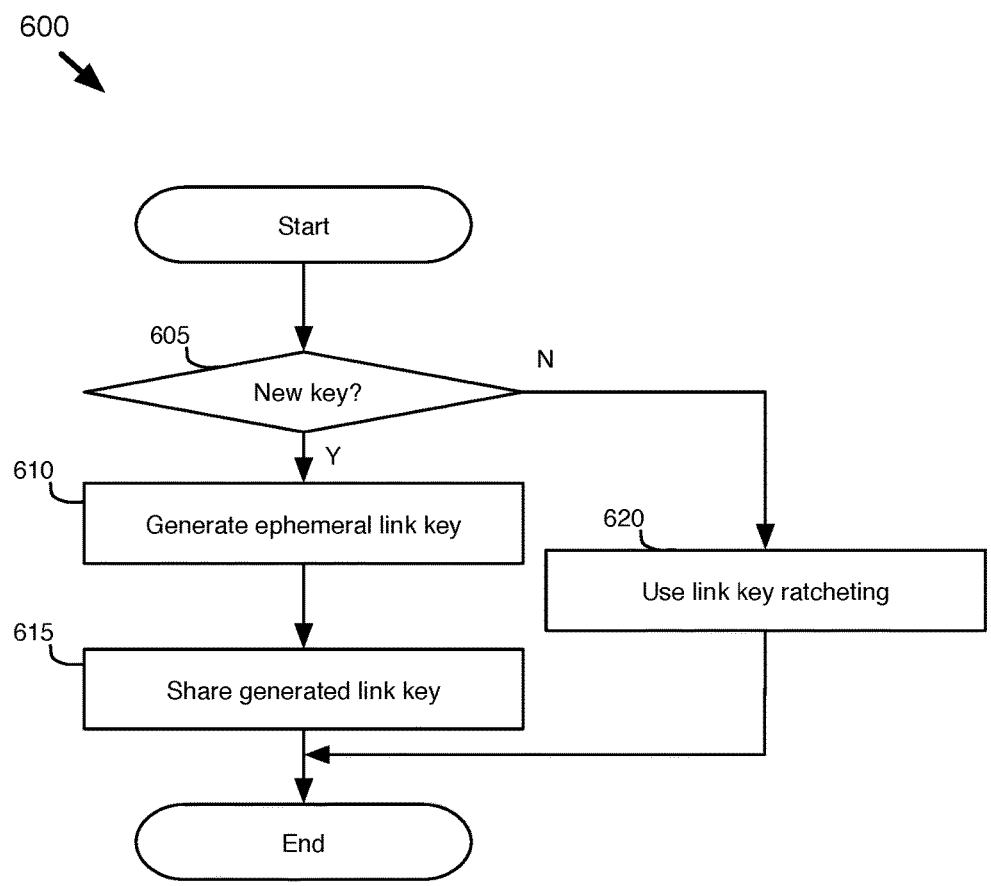
FIG. 6 conceptually illustrates a process for establishing communication sessions with a combination of ephemeral key generation and link key ratcheting.

FIG. 6 conceptually illustrates a process for establishing communication sessions with a combination of ephemeral key generation and link key ratcheting. The process 600 of some embodiments is performed by devices that have specialized hardware for generating ephemeral shared secrets. In some embodiments, the process 600 is performed each time a communication session is initiated between a set of devices.

The process 600 begins by determining (at 605) whether to use a new key. The process 600 uses both ephemeral key generation and link key ratcheting to generate new keys for each communication session in order to balance the heightened security provided by the ephemeral key generation with the convenience and power savings of the link key ratcheting. In some embodiments, the process 600 determines (at 605) to use a new key periodically. For example, in some embodiments, a new key is used after a set period of time (such as once daily) or when a particular period of time has passed since a previous communication session was established with the device. In some embodiments, the process 600 determines (at 605) to use a new key based on battery levels (e.g., using ratcheted keys when battery levels are low).

When the process 600 determines (at 605) to use a new key, the process generates (at 610) an ephemeral link key. The ephemeral link key of some embodiments generates the link key using a secure method (or specialized hardware for performing such a method) to generate a shared secret (e.g., Diffie-Hellman). The process 600 then shares (at 615) the generated link key with the other devices (e.g., the accessory device, connected device, etc.).

When the process 600 determines (at 605) to not use a new key (e.g., to save power or for increased performance), the process 600 uses (at 620) the link key ratcheting process to modify the link keys in order to secure the communication session, as described in the examples above. Examples of the ratcheting process are also described with reference to FIGS. 7 and 8.

Figure 7:
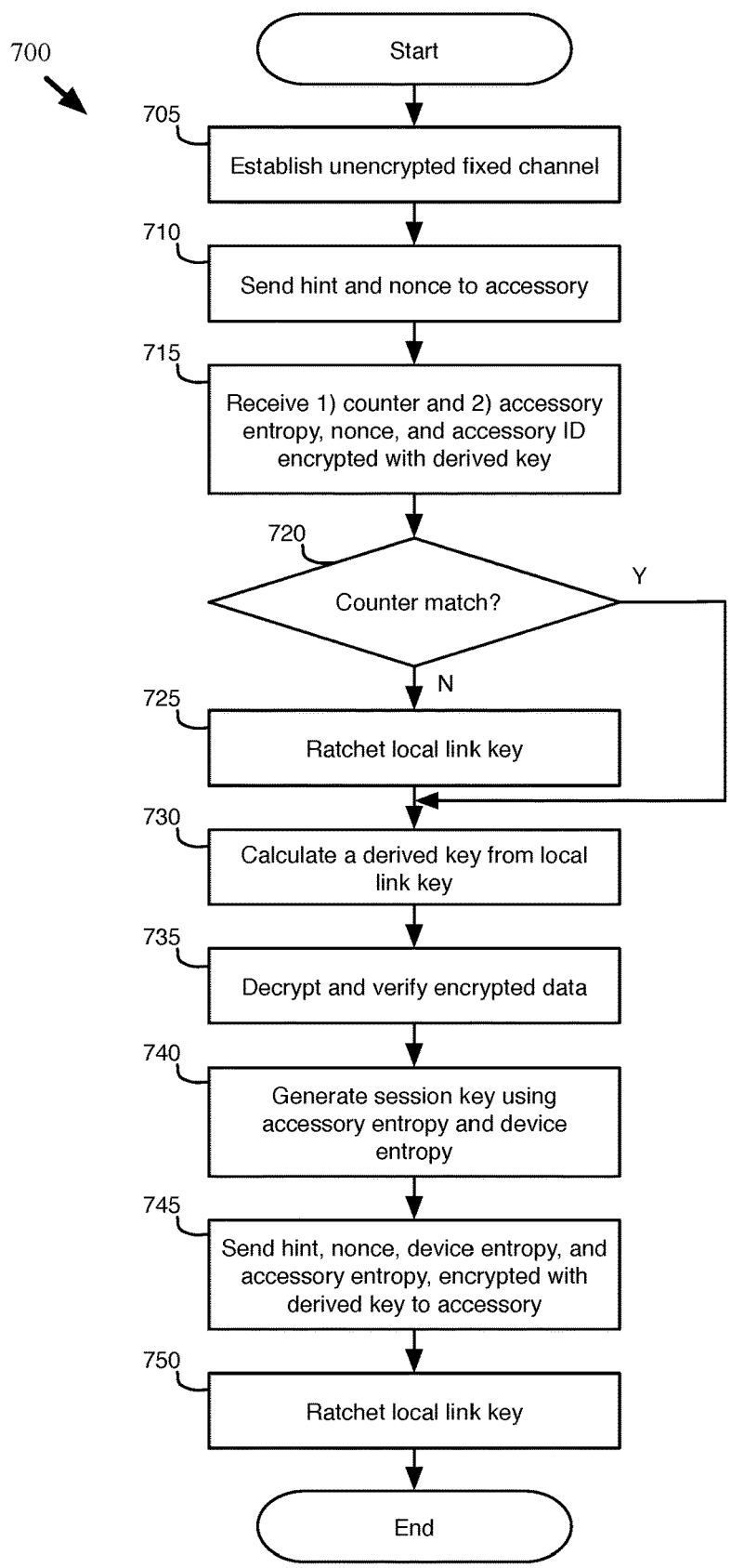
FIG. 7 conceptually illustrates a process for establishing a communication session with backward security from a connected device.

FIG. 7 conceptually illustrates a process for establishing a communication session with backward security from a connected device. The process 700 of some embodiments is performed by a connected device (e.g., a device associated with a cloud service account). The process 700 establishes (at 705) an unencrypted fixed channel from the connected device to an accessory device. The process 700 then sends (at 710) a hint and a nonce to the accessory device. The accessory device uses the hint to identify a shared link key stored at the accessory device.

At 715, the process 700 receives a message with an unencrypted counter value associated with the shared link key, along with an encrypted portion. The encrypted portion is encrypted with a key that is derived from the shared link key. The encrypted portion of some embodiments includes an accessory entropy, the nonce that was sent (at 710) to the accessory, and an accessory ID (e.g., BD_ADDR). In order to ensure that the counter is not tampered with, the message of some embodiments is encrypted with an encryption function (e.g., AES-SIV) that generates a validation value that is used to validate the integrity of the header and the encrypted portion. In some such embodiments, the message cannot be decrypted when the validation value is modified.

The process 700 then determines (at 720) whether the received unencrypted counter matches a local counter stored at device 110. When the process 700 determines (at 720) that the counters match, the process 700 proceeds to step 730 described below.

When the process 700 determines (at 720) that the counters do not match, the process 700 ratchets (at 725) the local link key (e.g., the link key stored at the device) based on the discrepancy. For example, if the counter is greater than the counter of the local link key, the process 700 ratchets (e.g., through a one-way function) the local link key and increments the counter for the local link key until the received counter matches the local counter. Once the local key is ratcheted so that the counters are matched, the process 700 calculates (at 730) a derived key from the local link key. In some embodiments, the derived key is based on a set of constants (e.g., bt_aessivauthent||bt_aessiveencrypt) and is used to generate a 256-bit derived key from a 128-bit link key.

The process 700 then decrypts (at 735) the decrypted portion of the received message and verifies the decrypted information. In some embodiments, the process 700 verifies that the received message includes the nonce that was sent to the accessory, as well as the accessory ID for the accessory device. The decrypted portion of the received message also includes entropy from the accessory (i.e., accessory entropy) that is used to generate a shared session key.

At 740, the process 700 generates a shared session key using the accessory entropy, as well as device entropy that is generated at the device. The accessory and device entropies of some embodiments are random (or pseudo-random) numbers. In some embodiments, the entropies are manipulated with various functions (e.g., encryption functions, XOR functions, hashing functions, etc.) to generate the shared session key.

The process 700 then sends an encrypted message back to the accessory. The encrypted message is encrypted with the derived key, as the accessory does not yet have enough information to generate the session key. The message of some embodiments includes the hint and nonce that were sent (at 710) to the accessory to verify that the message is sent by the same device. The message also includes the device entropy and the accessory entropy so that the accessory can generate the shared session key. In some embodiments, the message does not include the accessory entropy because it is stored at the accessory device. The shared session key is then used to encrypt data transmitted as a part of a secure communication session.

Finally, after the secured session is ended, the process 700 ratchets (at 750) the local link key and increments the counter. In some embodiments, the process 700 stores the ratcheted local link key in a local key storage on the device and/or in a cloud key storage on a network (e.g., of a cloud service). Once the key is ratcheted, the previous shared link key cannot be retrieved. A similar ratcheting is performed at the accessory. Then the process 700 ends.

Figure 8:
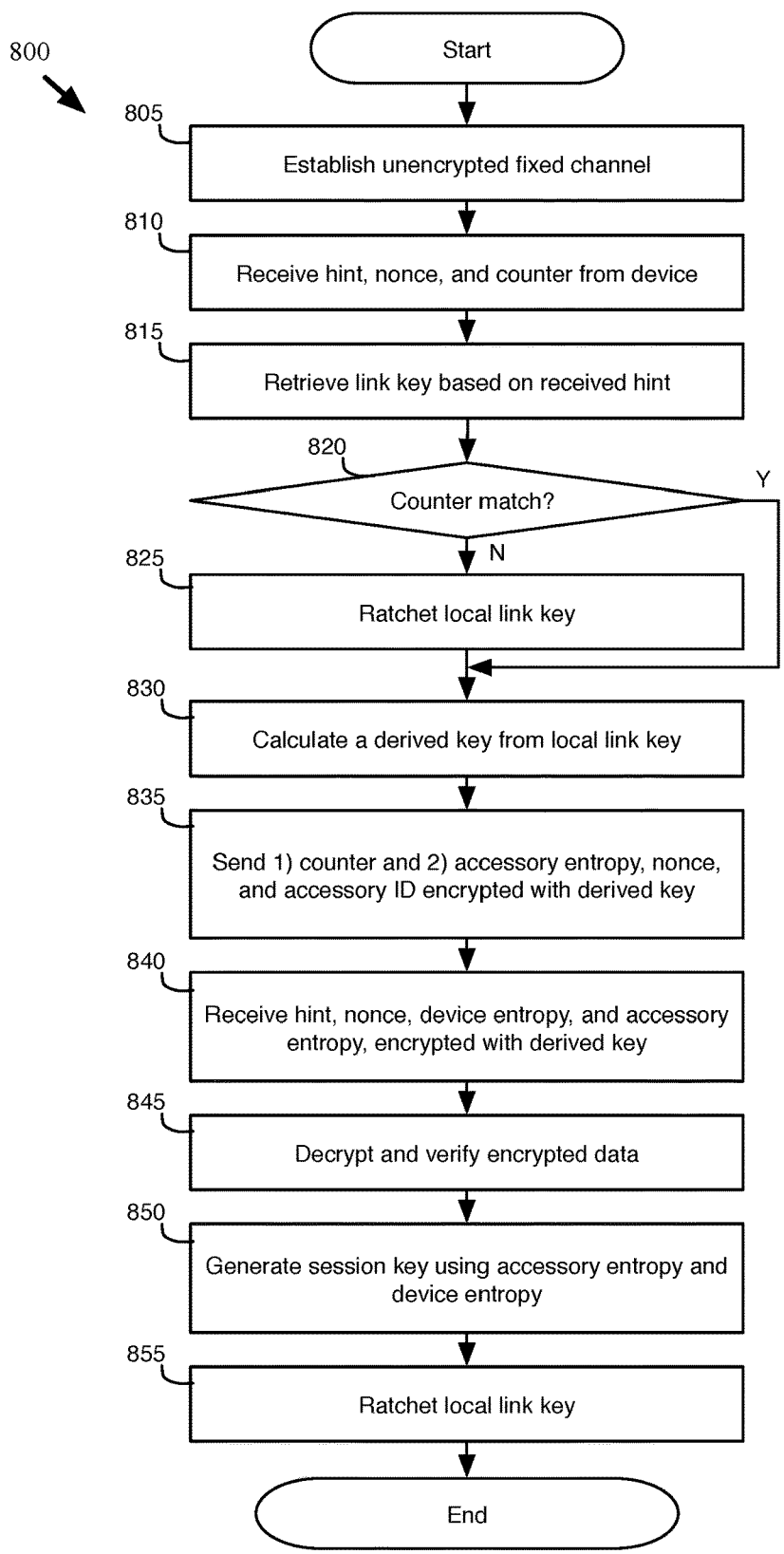
FIG. 8 conceptually illustrates a process for establishing a communication session with backward security from an accessory device.

FIG. 8 conceptually illustrates a process for establishing a communication session with backward security from an accessory device. The process 800 of some embodiments is performed by an accessory device that connects to a connected device (e.g., a device associated with a cloud service account). The process 800 establishes (at 805) an unencrypted fixed channel between the accessory device and the connected device. The process 800 then receives (at 810) a hint and a nonce from the connected device. The accessory device uses the hint to identify a link key stored at the accessory device that corresponds to a shared link key stored at the connected device.

At 815, the process 800 retrieves the corresponding link key from a local key storage based on the received hint. Process 800 then uses the retrieved link key to calculate (at 820) a derived key from the local link key. In some embodiments, the derived key is based on a set of constants (e.g., bt_aessivauthent|bt_aessiveencrypt) and is used to generate a 256-bit derived key from a 128-bit link key.

The process 800 then sends (at 825) a message with an unencrypted counter value associated with the local link key, along with an encrypted portion. The encrypted portion is encrypted with the derived key calculated at 820. The encrypted portion of some embodiments includes an accessory entropy, the nonce that was received (at 810), and an accessory ID (e.g., BD_ADDR). The accessory ID of some embodiments is a unique ID that is associated with each device that uses a particular communication protocol (e.g., Bluetooth).

The process 800 then receives (at 830) an encrypted message from the connected device. The process 800 decrypts (at 835) the encrypted message and verifies the decrypted information. In some embodiments, the process 800 also verifies (at 835) that the received message includes the nonce that was sent to the accessory, the hint, as well as the accessory entropy that was sent to the connected to the connected device. The decrypted portion of the received message also includes entropy from the connected device that is used to generate a shared session key.

At 840, the process 800 generates a shared session key using the accessory entropy, as well as device entropy that received from the connected device. The accessory and device entropies of some embodiments are random (or pseudo-random) numbers. In some embodiments, the entropies are manipulated with various functions (e.g., encryption functions, XOR functions, hashing functions, etc.) to generate the shared session key. The shared session key is used to secure a communication session between the accessory device and the connected device.

Finally, after the secured session is ended, the process 800 ratchets (at 850) the local link key, increments the counter, and stores them in the local key storage of the accessory device. In some embodiments, a similar ratcheting is performed at the connected device and the ratcheted link key and the incremented counter are stored in the cloud service of the user. Once the key is ratcheted, the previous shared link key cannot be retrieved. Then the process 800 ends. By modifying the link keys at both of the devices at the end of each communication session, in a predictable, but non-reversible way, the session protocol provides backward security for low-power, low-capability devices.

II. Electronic System

Many of the above-described features and applications are implemented as software processes that are specified as a set of instructions recorded on a computer readable storage medium (also referred to as a computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
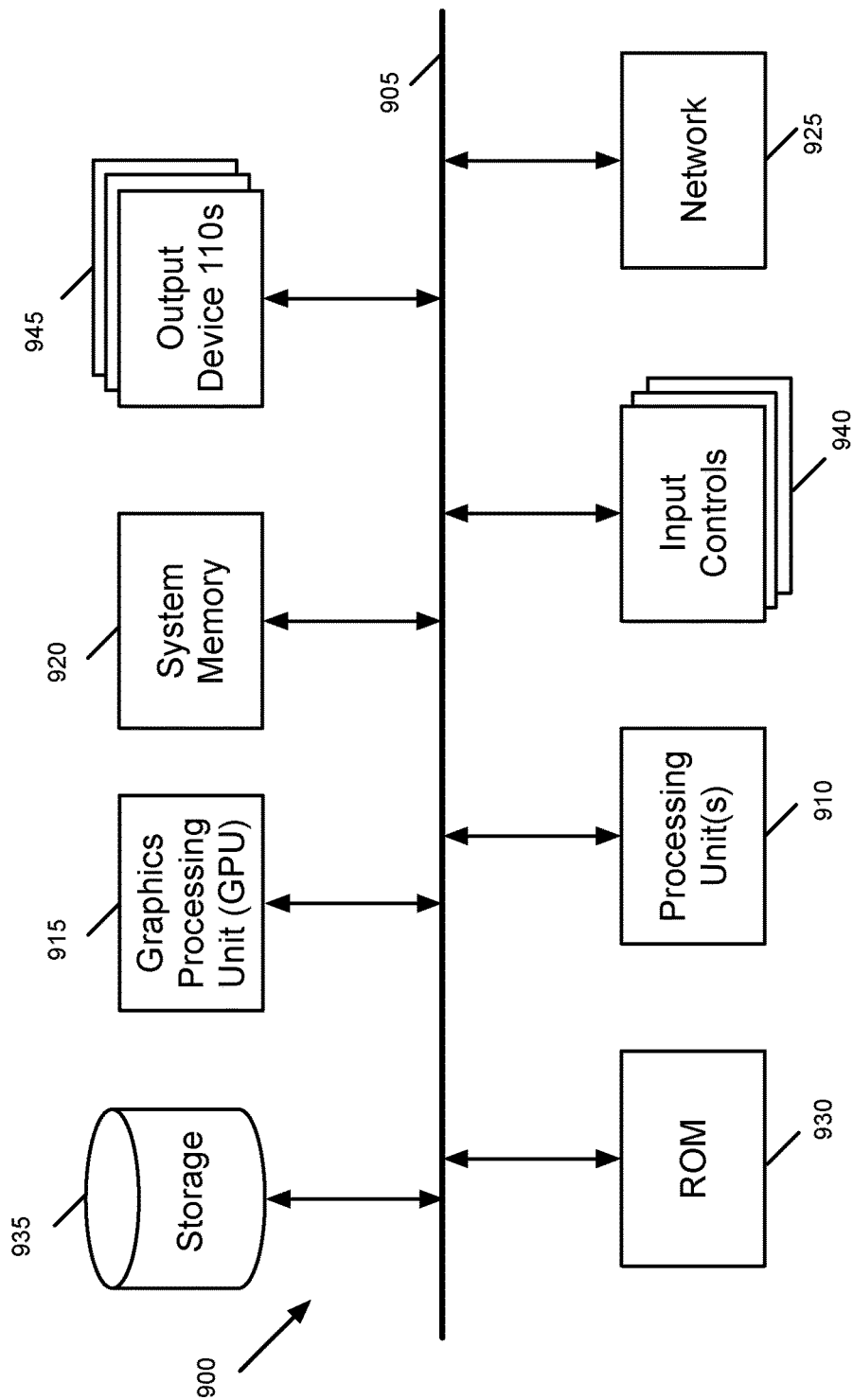
FIG. 9 conceptually illustrates an example of an electronic system with which some embodiments of the invention are implemented.

FIG. 9 conceptually illustrates an example of an electronic system 900 with which some embodiments of the invention are implemented. The electronic system 900 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 900 includes a bus 905, processing unit(s) 910, a graphics processing unit (GPU) 915, a system memory 920, a network 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the GPU 915, the system memory 920, and the permanent storage device 935.

From these various memory units, the processing unit(s) 910 retrieves instructions to execute and data to process in order to execute the processes of the invention. The processing unit(s) may be a single processor or a multi-core processor in different embodiments. Some instructions are passed to and executed by the GPU 915. The GPU 915 can offload various computations or complement the image processing provided by the processing unit(s) 910. In some embodiments, such functionality can be provided using CoreImage's kernel shading language.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive, integrated flash memory) as the permanent storage device 935.

Other embodiments use a removable storage device (such as a floppy disk, flash memory device, etc., and its corresponding drive) as the permanent storage device. Like the permanent storage device 935, the system memory 920 is a read-and-write memory device. However, unlike storage device 935, the system memory 920 is a volatile read-and-write memory, such a random access memory. The system memory 920 stores some of the instructions and data that the processor needs at runtime. In some embodiments, the invention's processes are stored in the system memory 920, the permanent storage device 935, and/or the read-only memory 930. For example, the various memory units include instructions for processing multimedia clips in accordance with some embodiments. From these various memory units, the processing unit(s) 910 retrieves instructions to execute and data to process in order to execute the processes of some embodiments.

The bus 905 also connects to the input and output devices 940 and 945. The input devices 940 enable the user to communicate information and select commands to the electronic system. The input devices 940 include alphanumeric keyboards and pointing devices (also called "cursor control devices"), cameras (e.g., webcams), microphones or similar devices for receiving voice commands, etc. The output devices 945 display images generated by the electronic system or otherwise output data. The output devices 945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 9, bus 905 also couples electronic system 900 to a network 925 through a network adapter (not shown). In this manner, the computer can be a part of a network of computers (such as a local area network ("LAN"), a wide area network ("WAN"), or an Intranet), or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 3, 6, 7, and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium storing a program which when executed by a set of processing units of a first device establishes a secured session with a second device, the program comprising sets of instructions for:
    establishing a communication session between the first and second devices using first and second shared keys stored at the first and second devices, respectively, the establishing comprising applying a one-way function to the first shared key to update the first shared key to match the second shared key when a local value corresponding to the first shared key differs from a received remote value corresponding to the second shared key;
    exchanging encrypted data between the first and second devices as a part of the communication session;
    upon completion of the communication session, deriving, using the one-way function, a modified first shared key from the first shared key at the first device, wherein a modified second shared key is derived from the second shared key at the second device using the one-way function; and
    storing the modified first shared key at the first device, wherein the encrypted data of the completed communication session and previous communication sessions are undecryptable using the first shared key.

2. The non-transitory machine readable medium of claim 1, wherein the set of instructions for establishing a communication session comprises a set of instructions for sending a message to the second device, the message comprising a key identifier, wherein the second device uses the key identifier to identify the second shared key at the second device.

3. The non-transitory machine readable medium of claim 2, wherein the first device is associated with a user account, wherein the key identifier is associated with the user account.

4. The non-transitory machine readable medium of claim 3, wherein a plurality of devices is associated with the user account and each device of the plurality of devices uses the same key identifier.

5. The non-transitory machine readable medium of claim 1, wherein the set of instructions for establishing a communication session comprises sets of instructions for:
    sending a message to the second device, the message comprising a verification value;
    receiving a response comprising the verification value; and
    verifying that the verification value has not been modified.

6. The non-transitory machine readable medium of claim 1, wherein the set of instructions for establishing a communication session comprises sets of instructions for:
    identifying the local value for the first shared key;
    receiving a first message from the second device comprising the remote value for the second shared key.

7. The non-transitory machine readable medium of claim 6, wherein the first message further comprises an encrypted portion, wherein the set of instructions for establishing the communication session further comprises a set of instructions for decrypting the encrypted portion of the first message based on a derived key that is derived using the updated shared key.

8. The non-transitory machine readable medium of claim 6, wherein the set of instructions for establishing a communication session further comprises:
    based on a local entropy value generated at the first device and a remote entropy value received in the first message from the second device, generating a session key; and
    sending a second message to the second device, wherein the second message comprises the local entropy value, wherein the second device uses the local entropy value and the remote entropy value to generate the session key, wherein the generated session keys are used to encrypt and decrypt the encrypted data exchanged between the first and second devices.

9. The non-transitory machine readable medium of claim 8, wherein the second message is encrypted based on the derived key.

10. The non-transitory machine readable medium of claim 6, wherein the set of instructions for identifying the local value comprises a set of instructions for, when the device is connected to a cloud service, receiving the local value and the first shared key from the cloud service.

11. The non-transitory machine readable medium of claim 10, wherein the set of instructions for storing the modified shared key at the first device comprises storing the updated shared key and an updated local value with the cloud service.

12. The non-transitory machine readable medium of claim 1, wherein the set of instructions for deriving the modified first shared key from the first shared key at the first device comprises a set of instructions for applying a one-way function to the first shared key at the first device to derive the modified first shared key from the first shared key.

13. The non-transitory machine readable medium of claim 1, wherein the set of instructions for establishing a communication session comprises sets of instructions for:
    receiving a message from the second device, wherein the message comprising a key identifier; and
    identifying the shared key and a local count at the first device based on the key identifier.

14. The non-transitory machine readable medium of claim 1, wherein the program further comprises a set of instructions for pairing the devices, which comprises sets of instructions for:
    communicating with the second device to generate the first and second shared keys at the first and second devices; and
    storing the generated first shared key at a cloud service associated with the first device, wherein the second device stores the generated second shared key at a storage of the second device.

15. A method of a first device for establishing a secured session with a second device, the method comprising:
    establishing a communication session between the first and second devices using first and second shared keys stored at the first and second devices, the establishing comprising applying a one-way function to the first shared key to update the first shared key to match the second shared key when a local value corresponding to the first shared key differs from a received remote value corresponding to the second shared key;

exchanging encrypted data between the first and second devices as a part of the communication session;

upon completion of the communication session, modifying, using the one-way function, the shared key at the first device, wherein the shared key is modified at the second device using the one-way function independent of the first device; and storing the modified shared key at the first device, wherein the modified shared key cannot be used to decrypt any portion of the encrypted data of the completed communication session and previous communication sessions.

16. The method of claim 15, wherein establishing a communication session comprises sending a message to the second device, the message comprising a key identifier, wherein the second device uses the key identifier to identify the second shared key at the second device.

17. The method of claim 16, wherein the first device is associated with a user account, wherein the key identifier is associated with the user account.

18. The method of claim 17, wherein a plurality of devices is associated with the user account and each device of the plurality of devices uses the same key identifier.

19. The method of claim 15, wherein establishing a communication session comprises:

receiving a first message from the second device comprising the remote value for the second shared key.

20. A device comprising:

a memory; and at least one processor configured to:

establish a communication session between first and second devices using first and second shared keys stored at the first and second devices, the establishing comprising applying a one-way function to the first shared key to update the first shared key to match the second shared key when a local value corresponding to the first shared key differs from a received remote value corresponding to the second shared key;

exchanging encrypted data between the first and second devices as a part of the communication session;

upon completion of the communication session, modify, using the one-way function, the shared key at the first device, wherein the shared key is modified at the second device using the one-way function; and store the modified shared key at the first device, wherein the modified shared key cannot be used to decrypt any portion of the encrypted data of the completed communication session and previous communication sessions.

21. The device of claim 20, wherein the at least one processor is configured to establish the communication session by:

sending a message to the second device, the message comprising a key identifier, wherein the second device uses the key identifier to identify the second shared key at the second device.

22. The device of claim 21, wherein the first device is associated with a user account, wherein the key identifier is associated with the user account.

23. The device of claim 22, wherein a plurality of devices are associated with the user account and each device of the plurality of devices uses the same key identifier.

24. The device of claim 20, wherein the at least one processor is configured to establish the communication session by:

sending a message to the second device, the message comprising a verification value; receiving a response comprising the verification value; and verifying that the verification value has not been modified.

25. The device of claim 20, wherein the at least one processor is configured to establish the communication session by:

identifying the local value for the first shared key; receiving a first message from the second device comprising the remote value for the second shared key.

26. The device of claim 25, wherein the first message further comprises an encrypted portion, and the at least one processor is configured to establish the communication session by decrypting the encrypted portion of the first message based on a derived key that is derived using the updated shared key.

27. The device of claim 26, wherein the second message is encrypted based on the derived key.

28. The device of claim 25, wherein the at least one processor is configured to establish the communication session by:

based on a local entropy value generated at the first device and a remote entropy value received in the first message from the second device, generating a session key; and sending a second message to the second device, wherein the second message comprises the local entropy value, wherein the second device uses the local entropy value and the remote entropy value to generate the session key, wherein the generated session keys are used to encrypt and decrypt the encrypted data exchanged between the first and second devices.

29. The device of claim 25, wherein the at least one processor is configured to identify the local value by, when the device is connected to a cloud service, receiving the local value and the first shared key from the cloud service.

30. The device of claim 29, wherein the at least one processor is configured to store the modified shared key at the first device by storing the updated shared key and an updated local value with the cloud service.

31. The device of claim 20, wherein the at least one processor is configured to derive the modified first shared key from the first shared key at the first device by applying a one-way function to the first shared key at the first device to derive the modified first shared key from the first shared key.

32. The device of claim 20, wherein the at least one processor is configured to establish a communication session by:

receiving a message from the second device, wherein the message comprising a key identifier; and identifying the shared key and a local count at the first device based on the key identifier.

33. The device of claim 20, wherein the at least one processor is further configured to:

communicate with the second device to generate the first and second shared keys at the first and second devices; and store the generated first shared key at a cloud service associated with the first device, wherein the second device stores the generated second shared key at a storage of the second device.

* * * * *